United States Patent
Khambatta et al.

[11] 3,800,383
[45] Apr. 2, 1974

[54] METHOD OF MAKING A TRUNNION AND BEARING BODY ASSEMBLY FOR A UNIVERSAL JOINT

[75] Inventors: Sarosh M. Khambatta, Chicago; Brian L. Asimor, Melrose, both of Ill.

[73] Assignee: Enrique H. Orazco, Chicago, Ill. ; a part interest

[22] Filed: Sept. 6, 1972

[21] Appl. No.: 286,671

[52] U.S. Cl.......... 29/148.4 A, 29/149.5 R, 29/417, 29/430, 29/434, 64/17
[51] Int. Cl... B23p 11/00, B23p 17/00, B23p 19/00
[58] Field of Search........ 29/148.4 A, 149.5 R, 430, 29/434, 438, 417; 64/17

[56] References Cited
UNITED STATES PATENTS

| | | | |
|---|---|---|---|
| 2,238,335 | 4/1941 | MacGregor | 64/17 |
| 2,291,436 | 7/1942 | Anderson | 29/149.5 R |
| 2,304,666 | 12/1942 | Sturges | 29/149.5 R |
| 3,213,644 | 10/1965 | Murphy | 64/17 |
| 3,650,123 | 3/1972 | Sheppard, Jr. | 64/17 |
| 3,701,189 | 10/1972 | Kodono et al. | 29/148.4 A |

*Primary Examiner*—Thomas H. Eager
*Attorney, Agent, or Firm*—Thomas R. Vigil; Silverman & Cass

[57] ABSTRACT

The trunnion and bearing body assembly includes a circular or octagonal center block formed from bar stock and having four equally spaced bores which extend into but not through the center block. The universal joint also includes four trunnions each made from circular cross section bar stock and having a reduced diameter pin-forming section which is received in one of the bores in the center block. A larger diameter portion of each trunnion is receivable in an opening in the yoke forming part of a universal joint. The method includes the steps of forming the center block and the trunnions from two lengths of standard bar stock.

1 Claim, 8 Drawing Figures

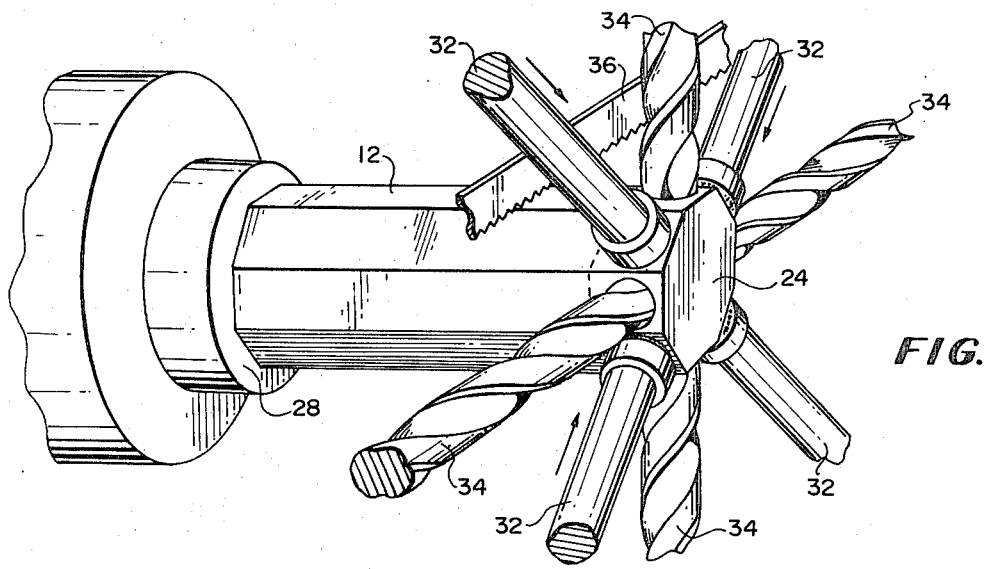
FIG. 1
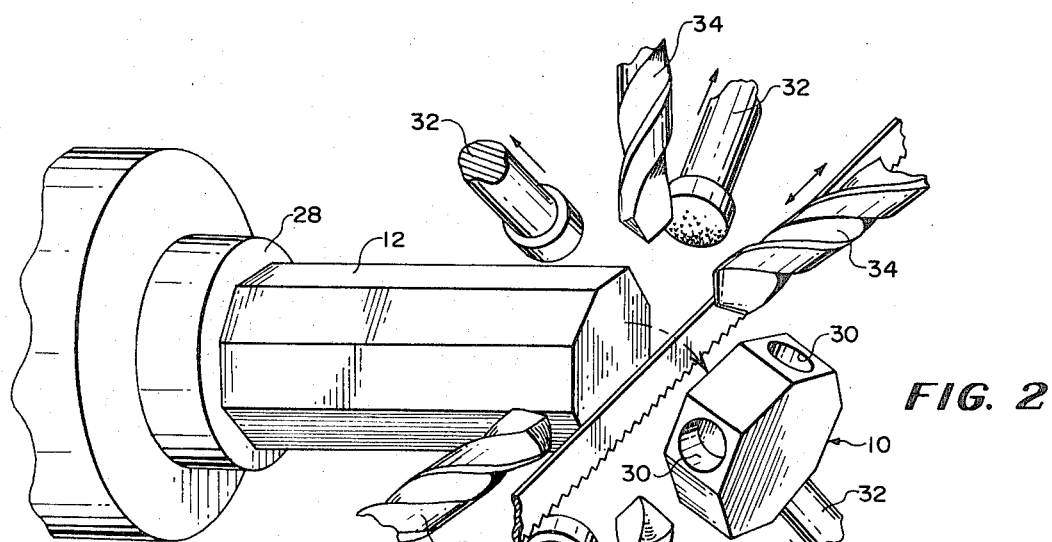
FIG. 2
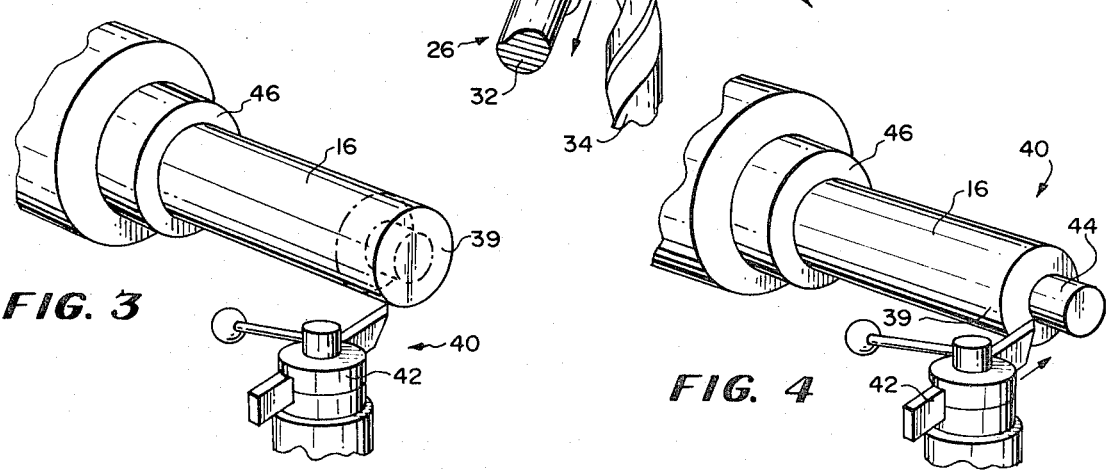
FIG. 3
FIG. 4

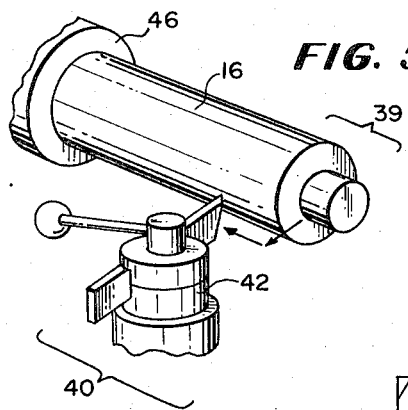
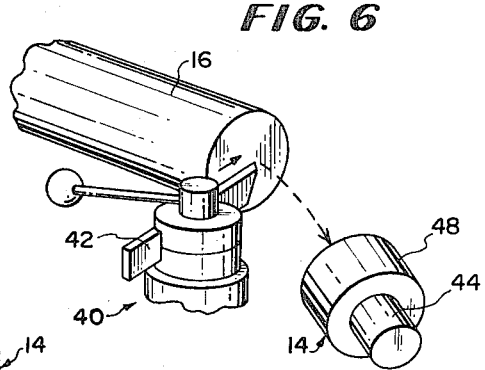
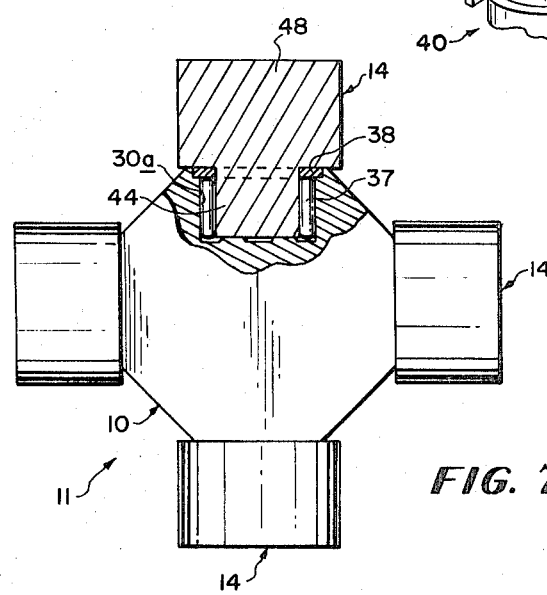
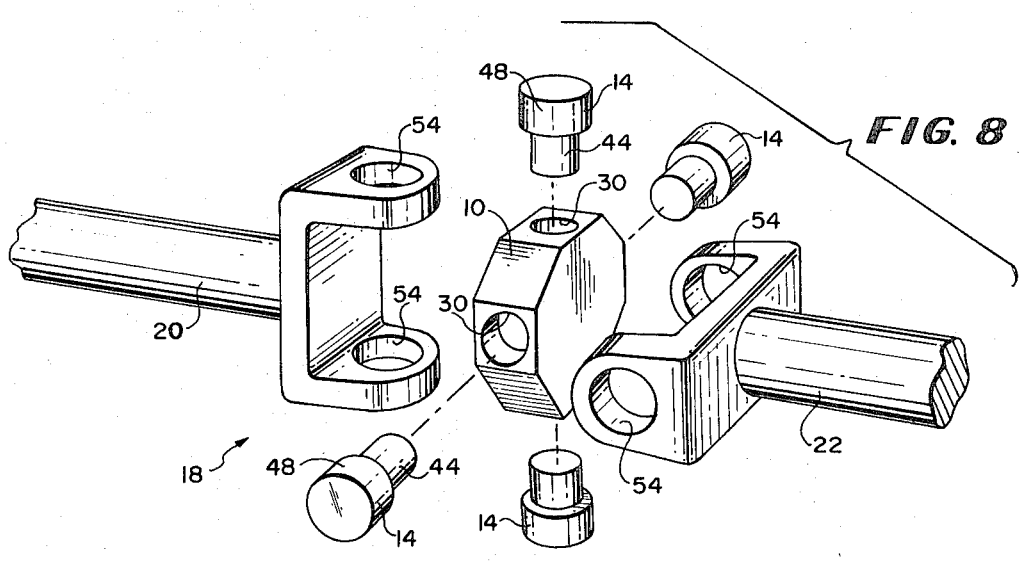

METHOD OF MAKING A TRUNNION AND BEARING BODY ASSEMBLY FOR A UNIVERSAL JOINT

BACKGROUND AND SUMMARY OF THE INVENTION

The present invention relates to a method of making an improved universal joint. More specifically the present invention relates to a trunnion and bearing body assembly for use in a universal joint.

Most of the presently available universal joints utilize a cross and bearing assembly comprising a center block formed from a forging and having four equally spaced trunnions extending therefrom. The trunnions form a cross and the forged center block is commonly referred to as the cross or spider. Initially the forged center block has four projections which are subsequently machined to form the four trunnions whereby each trunnion has a smooth cylindrical surface. The cross and bearing assembly also includes four bearings. The universal joint, of course, includes two yokes with each yoke mounting two bearings. Each bearing is received over one of the trunnions. Each of the bearings can consist of a simple sleeve bearing in a bearing mount or of a needle bearing assembly.

From the foregoing it will be apparent that the manufacture and assembly of each cross and bearing assembly require several machining and assembly operations which contribute significantly to the cost of each universal joint utilizing a cross and bearing assembly.

Forgings require stress relieving treatment which contributes to the cost thereof. Also defective forgings are periodically encountered resulting in losses. These losses are even greater when the defects are discovered after the machining of the trunnions. In view of the large use of universal joints in automobiles and trucks, it is desirable to minimize these losses and to simply the manufacture and assembly of universal joints thereby to reduce their cost.

With the trunnion and bearing body assembly of the present invention, it is estimated that a universal joint can be manufactured and assembled for approximately two-thirds of the cost of conventional universal joints using a conventional cross and bearing assembly. This cost saving of 30–35 percent is obtained by manufacturing a center block and four trunnions from standard bar stock which have consistent metalurgical uniformity. In the trunnion and bearing body assembly of the invention, four bores are formed in an end portion of bar stock having a circular or octagonal cross section. The end portion having the bores therein is then separated from the remainder of the bar stock thereby to form the center block. The trunnions are likewise formed from a length of bar stock which has a circular cross section and which has a smaller cross-sectional extent than the bar stock from which the center block is formed. In forming the trunnions, a section of an end portion of the bar stock is cut down to form a reduced diameter section and then the end portion is separated from the remainder of the bar stock. The reduced diameter section forms a trunnion pin which is received in one of the bores of the center block. The larger diameter section of the trunnion is received in an opening in a yoke of the universal joint.

By using a material - bar stock - which is virtually free of internal defects by reason of a generally uniform crystalline structure and by employing programmed machining operations, it is believed that very few losses will be incurred in the manufacture of the trunnion and bearing body assemblies of the invention, the only apparent losses resulting from the short pieces of bar stock remaining at the end of a length of bar stock, which has been cut into a plurality of trunnions or bearing bodies, and these short pieces of bar stock can be salvaged for their metal content.

Heretofore, it has been proposed to form a universal joint with a cross block having bores therein which receive pivot pins mounted to a yoke. An example of such a universal joint which apparently utilizes a center block formed from a casting, is disclosed in U.S. Pat. No. 3,213,644. Also, the use of a cylindrical wheel casting assembly made from a plurality of parts for a center body has been proposed in U.S. Pat. No. 2,024,777. It has also been proposed in U.S. Pat. Nos. 2,355,781 and 3,103,798 to make an intermediate or body portion from square or rectangular bar stock or from tubular stock.

The method and assembly of the present invention differ from the previously proposed universal joints in that, according to the invention, there is provided a method for making a trunnion and bearing body assembly for a universal joint including the steps of: arranging a length of first bar stock having either a circular or octagonal cross section in position for intermittent feeding to a first operating station; forming at the first operating station four equally spaced cylindrical bores in the bar stock, the axis of each bore being substantially in line with the axis of an opposite bore and being substantially 90° from the axis of the other two bores, the bores opening onto the side surface of the bar stock and extending into but not through the bar stock; separating a given length of the end portion with the bores therein from the remainder of the bar stock thereby to form a center block for a trunnion and bearing body assembly of a universal joint; arranging a length of second bar stock having a circular cross section in position for intermittent feeding to a second operating station, the second bar stock having a smaller cross-sectional extent than the first bar stock; feeding an end portion of the second bar stock to the second operating station; forming a cylindrical section of reduced diameter in said end portion; separating the end portion with the cylindrical section from the remainder of the second bar stock to form a trunnion having a pin defined by the reduced diameter section; and forming three additional trunnions in the same manner.

Also, according to the invention, there is provided a trunnion and bearing body assembly for a universal joint, the assembly including a center block made from bar stock having a circular or octagonal cross section, and four trunnions made from bar stock having a circular cross section.

BRIEF DESCRIPTION OF THE DRAWINGS

FIG. 1 is a perspective view of an end portion of octagonal bar stock as it is being formed into a center block for a trunnion and bearing body assembly of a universal joint;

FIG. 2 is a perspective view similar to FIG. 1 and showing the center block as separated from the remainder of the bar stock;

FIG. 3 is a perspective view of the end portion of a length of circular bar stock just prior to the forming of a trunnion therefrom;

FIG. 4 is a perspective view similar to FIG. 3 showing the end portion of the circular bar stock after an annular section of material has been removed to form a reduced diameter pin-forming section;

FIG. 5 is a perspective view similar to FIG. 3 and showing the relative displacement movement between the end portion of the bar stock and a cutting tool;

FIG. 6 is a perspective view similar to FIG. 3 and showing the separation of the trunnion formed in the end portion of the bar stock from the remainder of the bar stock;

FIG. 7 is a plan view of one embodiment of the trunnion and bearing body assembly with portions broken away to show needle bearings surrounding one trunnion pin; and FIG. 8 is an exploded perspective view of a universal joint utilizing the trunnion and bearing body assembly of the invention.

DESCRIPTION OF THE PREFERRED EMBODIMENTS

FIGS. 1 and 2 illustrate several steps of the method of the invention for forming a bearing body or center block 10 (FIG. 2) of a trunnion and bearing body assembly 11 (FIG. 7) from a length of bar stock 12 having an octagonal cross section. FIGS. 3–6 illustrate several steps in the method of the invention for forming one of four trunnions 14 (FIG. 6) for the assembly 11 from a length of bar stock 16 having a circular cross section. The trunnion and bearing body assembly 11 with the trunnions 14 in the center block 10 is shown in FIG. 7 and an exploded view of a universal joint assembly 18 including the trunnion and bearing body assembly 11 and two yokes 20 and 22 is shown in FIG. 8.

Although only octagonal cross-sectional bar stock 12 is shown in FIGS. 1 and 2, it is to be understood that, according to the teachings of the invention, the center block 10 also can be made from bar stock having a circular cross section. Only octagonal or circular bar stock is used in order to provide a strong and balanced center block 10. In this respect both strength and balance are enhanced by providing generally annular segments of material in the block between adjacent bores and by avoiding or minimizing projections on the periphery of the center block. These two structural features are obtained with circular or octagonal bar stock. It is to be noted that a circular block with four equally spaced flats thereon for facilitating drilling of bores therein is essentially octagonal. Although, in octagonal bar stock not all of the volume in the annular segments between bores is filled with material, octagonal stock is preferred since four equally spaced flats are present thereon, thereby facilitating the holding of the bar stock in place and the drilling of holes therein.

According to the method of the invention, a length of the bar stock 12 is arranged in position for feeding an end portion 24 of the bar stock 12 to an operating station 26. Typically, this is done with a conventional automatic feed lathe which is operable to intermittently feed the bar stock to the operating station. It is to be understood that programming devices of known type are utilized for controlling the intermittent moving of the bar stock 12 to the operating station 26. As shown in FIGS. 1 and 2, the bar stock 12 is supported in a collet 28 through which it is intermittently slid toward the operating station 26. The amount of travel of the bar stock 12 each time it is fed to the operating station 26 is equal to the length or thickness of the center block 10 to be formed.

At the operating station 26, four equally spaced bores 30 (FIG. 2) are formed in the end portion 24 and a length of the end portion 24 having the bores 30 therein is separated from the remainder of the bar stock to form the center block 10 as shown in FIG. 2. In FIGS. 1 and 2, there are shown four gripping members 32 which are movable radially to and from the end portion 24 of the bar stock 12 for holding the end portion 24 in place while the four bores 30 are formed in the end portion 24. Also, in FIGS. 1 and 2, four drills 34 are shown for drilling the four bores 30 in the end portion 24. Although not shown in detail, it is to be understood that the drills 34 and the support members 32 are part of an operating mechanism of the lathe and suitable mechanisms (not shown) are provided for moving the drills 34 and support members 32 inwardly and outwardly from the bar stock 12 and for operating the drills 34 for drilling the bores 30 in the end portion 24.

Also, and as will be apparent from FIG. 7, the drills 34 preferably have a special configuration, other than the conventional tip configuration shown in FIG. 2, for forming a flat-bottomed bore with a counterbore. This special type of drill tip is of a known type and the bore formed thereby is shown at 30a in FIG. 7.

The lathe or machine tool for forming the center blocks 10 also includes a device 36 such as a saw blade for cutting through the bar stock 12 thereby to separate the end portion 24 from the remainder of the bar stock 12 for completing the formation of the center block 10. It is to be understood, of course, that the cutting device 36 can take other forms than the saw blade. In this respect, the cutting device could be a laser beam, a cutting torch or a lathe cutting tool.

After the center block 10 is formed as shown in FIG. 2, the method can include the further steps of heat treating, finish grinding, buffing, deburring, polishing and/or plating the center block 10.

Also, the method for forming the trunnion and bearing body assembly 11 can include the steps of mounting needle bearings 37 in the bore 30a and inserting a retainer ring 38 over the bearings 37 as shown in FIG. 7. In most applications, needle bearings 37 are utilized.

As shown in FIGS. 3–6, the method of the invention includes steps for making a plurality of the trunnions 14 including: arranging the length of bar stock 16 for feeding an end portion 39 thereof to a second operating station 40 at which there is located a device 42 for removing a portion of the end portion 39 to produce a reduced diameter section 44 (FIG. 4) in the end portion 39. In the illustrated embodiment, the device 42 is a cutting tool for a machine tool and is arranged for cutting down the end portion 39 to form the reduced diameter section 44 which defines a trunnion pin. The machine tool is of known type and includes a collet 46 through which the length of bar stock 16 is fed. Although not shown, it is to be understood that the machine tool includes a conventional releasable chuck for holding the bar stock 16 while it is rotated and while the cutting tool 42 is fed radially into the end portion 39. Also, the machine tool includes a suitable conventional mechanism for intermittently feeding the end portion of the bar stock 16 to the second operating station 40.

After the desired cylindrical section 44 has been formed in the end portion 39, the bar stock 16 and/or the cutting device 42 are moved relative to each other to position the cutting tool 42 for cutting radially into the bar stock 16 to separate the end portion 39 from the remainder of the bar stock 16 and thereby form the trunnion 14, having the reduced diameter pin forming section 44 and a larger diameter section 48. These steps are illustrated in FIGS. 5 and 6. It will be understood that in making the trunnion and bearing body assembly 11, the steps just described are repeated four times to make four trunnions 14.

A preferred trunnion and bearing body assembly 11 is shown in FIG. 7. In the assembly 11, a plurality of needle bearings 37 are mounted within each of the bores 30 as shown for the bore 30a and are held within each bore by the retainer ring 38 received in the counterbored portion of each bore 30. The needle bearings 37, of course, provide smooth rolling friction between the trunnions 14 and the bores 30 in the center block 10.

As shown in FIG. 8, the larger diameter section 48 of each of the trunnions 14 is received in one of two openings 54 in each of the yokes 20 and 22. The mounting of each of the trunnions 14 in one of the bores 54 can vary depending upon the construction of the yokes. In this respect, the trunnions can be mounted in a variety of conventional yokes. For example, the trunnions can be received in the bores 54 after which a cover plate is secured over the opening 54 thereby to retain the trunnions 14.

For mounting in another conventional yoke, a groove can be formed in the larger diameter section 48 adjacent the shoulder between the section 48 and the reduced diameter section 44. A snap ring is positioned between one arm of the yoke 20 or 22 and the center block 10 and the trunnion 14 is inserted through the opening 54 with the pin 44 received in one of the bores 30 in the center block 10. Then the snap ring is snapped into the groove to prevent the trunnion 14 from moving radially outwardly of the center block 10.

In still another conventional yoke, an annular groove is formed within the opening 54 adjacent the outer end thereof. The length of the trunnion 14 is then made so that the larger diameter section does not extend past the annular groove in the bore 54 when the pin 44 is received into one of the bores 30. In this arrangement, the trunnion 14 is inserted through the opening 54 and into one of the bores 30 in the center block 10, after which a snap ring is inserted into the opening 54 and snapped into the annular groove. The snap ring is then in position to engage the trunnion 14 and prevent outward movement thereof from the bore 30.

It will be apparent from the foregoing description that the trunnion and bearing body assembly 11 of universal joint 18 is very flexible and can be utilized with any number of conventional yokes. Thus, the assembly 11 shown in FIG. 7 can be utilized as original equipment in the universal joint 18 or can be used as a replacement assembly for a universal joint.

Further, it will be apparent from the foregoing description that the assembly 11 and the method for making same provide a number of advantages, several of which have been described above and others of which are inherent in the invention. Some of these advantages are as follows:

1. The cost of manufacturing the trunnions 14 and the center block 10 of the assembly 11 is estimated to be substantially less than the cost for making cross and bearing assemblies presently used in conventional universal joints. This savings has been estimated to be 30 to 35 percent and is based on the fact that no forgings are required for the center block 10 which is made from standard bar stock and by the fact that no screw machine blanks or extruded blanks are required for end cap portions or bearings since the trunnions 14 are also made from standard bar stock;

2. Assembling of the parts 14 and 10 should take less time than the assembling of conventional equivalent parts. As a result, further savings may be incurred in assembling the assembly 11, either on original universal joints or in replacing a conventional cross and bearing assembly in a conventional universal joint;

3. Still another advantage is the fact that the method of the invention can be easily put into practice without the need for significant tooling costs inasmuch as standard mass production machine tools can be utilized for manufacturing the trunnions 14 and the center blocks 10 with minimal alteration to the machine tools utilized.

4. A universal joint rebuilt with the assembly 11 with the symetrical, circular or octagonal center block 10 does not affect the balance on a balanced shaft assembly after replacement installation;

5. Vibration incurred with the assembly 11 should be less than that incurred with conventional cross and bearing assemblies since the area of contact between the pins 44 and bores 30 is closer to the center of the universal joint than is the area of contact between the stub shafts and bearings in a conventional assembly. As a result, a universal joint 18 utilizing the assembly 11 should provide better reliability and a longer and more efficient working life than universal joints utilizing conventional cross and bearing assemblies;

6. Still another important advantage is the fact that presently available standard auxiliary parts such as snap rings, bolts, etc., and friction lubrication parts such as needle roller bearings, seals, etc., as used in present universal joints, also can be used with the assembly 11.

From the foregoing description, it will be apparent to those skilled in the art that modifications and variations can be made to the method of the invention and the trunnion and bearing body assembly formed thereby without departing from the spirit or scope of the invention. Accordingly, the scope of the invention is only to be limited as necessitated by the accompanying claims.

We claim:

1. A method for making a trunnion and bearing body assembly for a universal joint including the steps of: arranging a length of first bar stock having either a circular or octagonal cross section in position for intermittent feeding to a first operating station; forming at said first operation station four equally spaced cylindrical bores in said bar stock, the axis of each bore being substantially in line with the axis of an opposite bore and being substantially 90° from the axis of the other two bores, said bores opening onto the side surface of said bar stock and extending into but not through said bar stock; separating a given length of said end portion with said bores therein from the remainder of said bar stock thereby to form a center block for a trunnion and bearing body assembly of a universal joint; arranging a length of second bar stock having a circular cross section in position for intermittent feeding to a second operating station, said second bar stock having a smaller cross-sectional extent than said first bar stock; feeding an end portion of said second bar stock to said second operating station; forming a cylindrical section of reduced diameter in said end portion; separating said end portion with said cylindrical section from the remainder of said second bar stock to form a trunnion having a pin defined by said reduced diameter section; and forming three additional trunnions in the same manner.

* * * * *

UNITED STATES PATENT OFFICE
CERTIFICATE OF CORRECTION

Patent No. 3,800,383            Dated April 2, 1974

Inventor(s) SAROSH M. KHAMBATTA; BRIAN L. ASIMOR

It is certified that error appears in the above-identified patent and that said Letters Patent are hereby corrected as shown below:

In the Introductory Data, under code (73) change "ORAZCO" to -- OROZCO --.

Signed and sealed this 17th day of September 1974.

(SEAL)
Attest:

McCOY M. GIBSON JR.            C. MARSHALL DANN
Attesting Officer              Commissioner of Patents